US006856256B2

(12) United States Patent
Winkler

(10) Patent No.: US 6,856,256 B2
(45) Date of Patent: Feb. 15, 2005

(54) METHOD AND SYSTEM FOR DETECTING AND DIGITALLY TRANSMITTING ANALOG OUTPUT MEASURED QUANTITIES OF A NUMBER OF TRANSDUCERS

(75) Inventor: Bert Winkler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 653 days.

(21) Appl. No.: 09/913,116
(22) PCT Filed: Dec. 6, 2000
(86) PCT No.: PCT/DE00/04383
  § 371 (c)(1),
  (2), (4) Date: Dec. 3, 2001
(87) PCT Pub. No.: WO01/45232
  PCT Pub. Date: Jun. 21, 2001

(65) Prior Publication Data
US 2002/0136316 A1 Sep. 26, 2002

(30) Foreign Application Priority Data
Dec. 14, 1999 (DE) ........................................ 199 61 630

(51) Int. Cl.$^7$ .............................................. G08C 19/16
(52) U.S. Cl. .................... 340/870.01; 702/60; 375/344; 708/605
(58) Field of Search ...................... 340/870.01; 702/60; 375/344; 708/605

(56) References Cited

U.S. PATENT DOCUMENTS

| 5,027,306 A |   | 6/1991 | Dattorro et al. |
| 5,134,578 A | * | 7/1992 | Garverick et al. ........... 708/605 |
| 5,230,011 A | * | 7/1993 | Gielis et al. ................. 375/344 |
| 5,345,409 A | * | 9/1994 | McGrath et al. .............. 702/60 |

FOREIGN PATENT DOCUMENTS

| DE | 3603358 A1 | 8/1987 |
| EP | 0561067 A2 | 9/1993 |
| EP | 0602718 A2 | 6/1994 |

OTHER PUBLICATIONS

Instrument Transformers, IEC 60044–8 (1998) p. 1–19.
Communication Networks and Systems in Substations, IEC 61850–9–1 (1999) p. 1–67.

* cited by examiner

*Primary Examiner*—Timothy Edwards, Jr.
(74) *Attorney, Agent, or Firm*—Morrison & Foerster LLP

(57) ABSTRACT

Method and arrangement for sensing and digitally transmitting analog output measurement variables of a plurality of transformers The invention relates to a method and an arrangement for sensing and digitally transmitting analog output measurement variables of a plurality of transformers to a protective unit or panel unit in which digital measurement variables corresponding to the output measurement variables are transmitted to a data concentrator in which a telegram is formed with the digital measurement variables and a predetermined minimum sampling rate.

Figure 1:
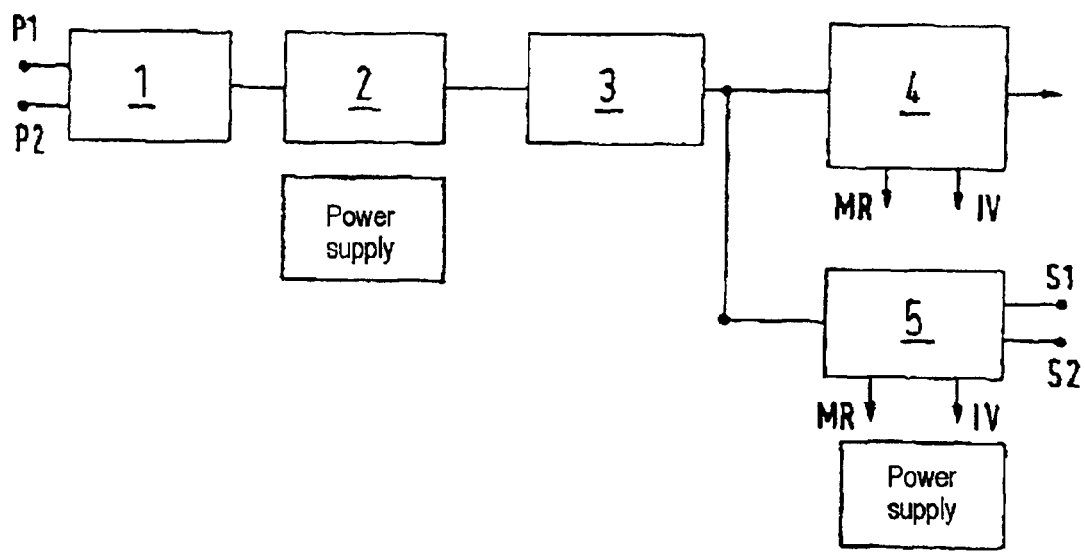

So that analog output measurement variables of transformers can be acquired, collected and transmitted to protective units or panel units at high speed and in synchronism with one another, the analog output measurement variables are converted into the digital measurement variables (Md) and transmitted with a sampling rate which is higher than the minimum sampling rate by a factor (m). Data is transferred, with the clock of a clock generator of the data concentrator (26), from buffers (Buf1) assigned to each transformer (ECT1 .. EVTBB) in the data concentrator (26) into buffers (Buf2) assigned upstream of the FIR filters (FIR). The telegram is composed, by means of a multiplexer (27), from output buffers (Buf3) assigned downstream of the FIR filters (FIR).

6 Claims, 4 Drawing Sheets

- Sampled values 1
- Sampled values 2
- Calculated values 2
- Calculated values 1

- Synchronized sampled values 1 and 2

METHOD AND SYSTEM FOR DETECTING AND DIGITALLY TRANSMITTING ANALOG OUTPUT MEASURED QUANTITIES OF A NUMBER OF TRANSDUCERS

DESCRIPTION

Method and arrangement for sensing and digitally transmitting analog output measurement variables of a plurality of transformers.

The invention relates to a method for sensing and digitally transmitting analog output measurement variables of a plurality of transformers to a protective unit or panel unit in which the analog output measurement variables of each transformer are converted into digital measurement variables, the digital measurement variables are transmitted to a data concentrator, a telegram with the digital measurement variables of the transformers is formed in the data concentrator with a predefined minimum sampling rate, and the telegram is transmitted to the protective unit or panel unit.

It is known that hitherto when connecting current transformers or voltage transformers an analog point-to-point connection of the respective transformer to the associated protective unit or panel unit has been implemented. Each protective unit or panel unit contains for this purpose a corresponding number of current input and voltage inputs. The current inputs and voltage inputs were implemented by means of specific terminals. The inputs were sampled simultaneously and in synchronism with the program sequence of the corresponding protective unit or panel unit at a rate of, for example, 1 ... 5 k sampling/s. Current transformers and voltage transformers were used for the d.c. isolation of the inputs in the protective unit or panel unit.

A disadvantage of this method or this arrangement is the high nominal apparent powers necessary for the transformers used, because they make them expensive. Therefore, for several years attempts have been made to define a new, lower power interface which permits more favorable dimensioning of the transformers. At the moment, efforts are being made to define an interface and a telegram structure for the digital transmission of transformer data. The draft standards IEC 61850-9-1 and IEC 60044-8 are the results of these efforts. Both draft standards use identical telegram contents but different transmission physics to transmit the transformer data. In the draft IEC 60044-8, a synchronous serial interface with 2.5 Mbit/s and Manchester coding is proposed for transmitting the transformer data.

FIG. 1 shows a block circuit diagram from these draft standards which show the basic connection of a transformer 1 with a downstream transformer, for example an analog-digital converter 2, to a digital transmission link 3. These draft standards provide a precisely defined transmission time for a telegram with sampled values. The time between the sampling of the analog output measurement variable of the respective transformer and the reception of the telegram with the sampled values is defined. Secondary transformers 4 and 5 are provided for adaptation purposes.

Figure 2:
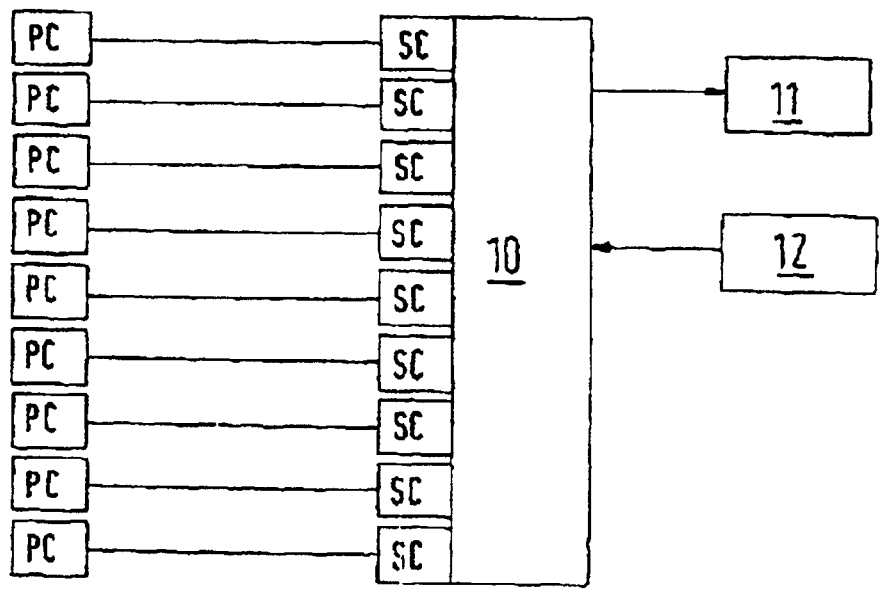

As is clear from FIG. 2, it is proposed in the draft standards to combine the digital measurement variables of the transformers for a branch into, for example, a transformer substation using what is referred to as a merging unit, a data concentrator 10. The data concentrator 10 outputs a telegram with the digital measurement variables to a protective unit or panel unit (not shown) at an output 11 and is connected via an auxiliary input 12 to a clock generator (also not illustrated). In FIG. 2, the elements 1 and 2 according to FIG. 1 are each designated PC, and the elements 4 and 5 are designated SC.

Figure 3:
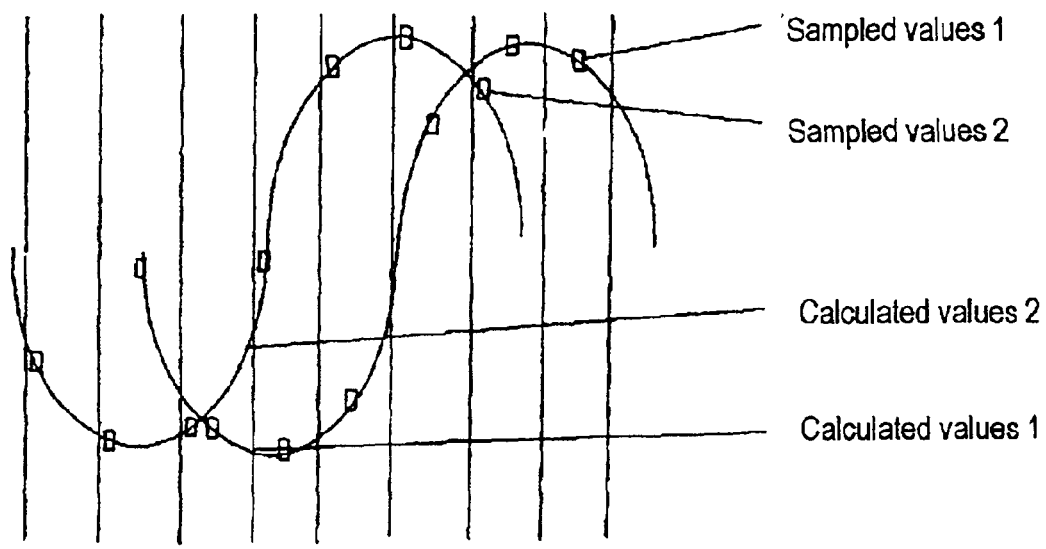

In the case of a digital transmission of the digital measurement variable formed from the output measurement variables of the transformers to the data concentrator, it is assumed that there is equidistant sampling of the individual analog output measurement variables of the transformers. Furthermore, it is assumed that chronological synchronization of the sampling of the output measurement variables for the various current and voltage transformers is also necessary from different branches of the transformer substation. There are two methods of synchronizing the sampling:

The first way could be to use the interpolation method. The different known time delays between the sampling of the sampled values of the output measurement variables transmitted in datagrams and the reception of the datagrams in the data concentrator and the measurable delay between the reception of the various datagrams of the individual transformers are used to assign a microsecond-precise sampling time to each received sampled value. Then, interpolation is carried out between the individual sampled values in order to convert all the received sampled values to a common sampling time. FIG. 3 illustrates this. This figure is taken from the abovementioned draft standard.

The disadvantage with this method is the high degree of expenditure on the time stamp device for the received datagrams, which is accurate to approximately 100 ns, and the necessary device for interpolating the sampled values in real time. If an interpolation polynomial (for example recursive splines interpolation of the third order) is used for the interpolation, an additional interpolation error is caused by the interpolation. The result of the interpolation can no longer be described with a linear transmission function i.e. the algorithm used is nonlinear. Alternatively, adaptive filters can also be used for the interpolation. In this case, the relatively high group delay time of the all pass filters which can be realized in practice (or low pass filters with a cutoff frequency which is significantly higher than the bandwidth to be used) has unfavorable effects. Furthermore, in order to adjust the adaptive filters, in this case a device is required with which the filter coefficients which have to be adjusted can be calculated. The LMS algorithm, for example, is suitable for this purpose. To implement this algorithm, either a digital signal processor DSP or a complex ASIC is required.

Figure 4:
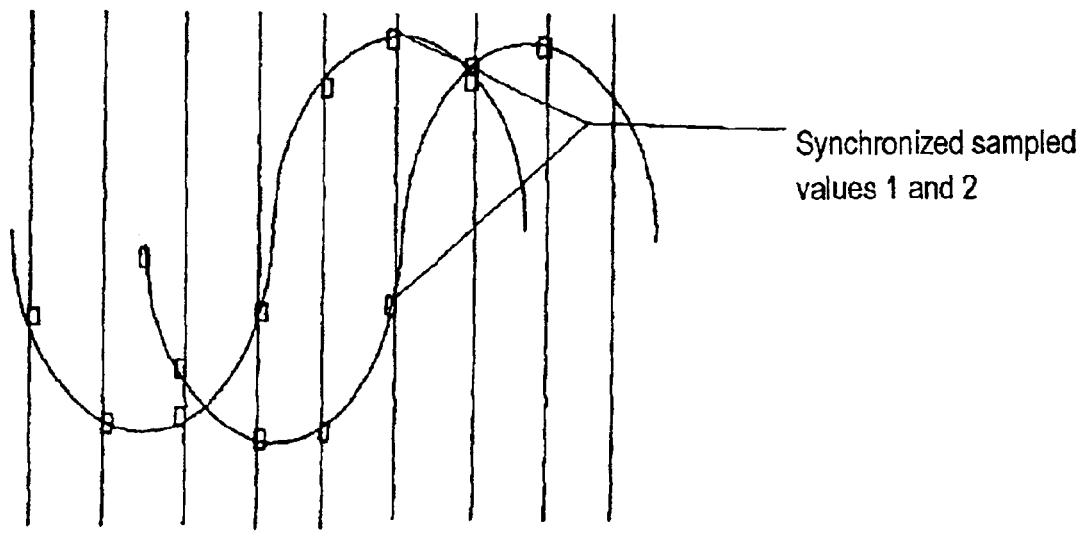

The second method consists in using a transformer substation-wide synchronization pulse. Because the signals made available by the transformers in a transformer substation are usually used by different devices, it is in fact never possible to decompose a transformer substation into individual sections in which a common sampling clock can be used for all the transformer output measurement variables to be synchronized. The entire transformer substation must always be supplied with a central sampling clock. In this case, all the transformers can generate sampled values which are sampled in synchronism with one another. FIG. 4 shows the diagram used in the draft standard mentioned above for illustrating the synchronously sampled signals.

Methods which operate with a central clock for synchronizing the sampling of different transformers are basically problematical for reasons of reliability because when the central clock fails all the transformer signals of the entire transformer substation fail together. Redundancy concepts can only mask this fundamental problem because, in order to synchronize the sampling, the clock which is to be used must always be generated at a central location. Furthermore, with this method a bidirectional connection to the individual transformers is basically necessary.

In the draft IEC 61850-9-1, a 100 Mbit Ethernet interface is proposed. When Ethernet interfaces are used, a central sampling clock is basically required for synchronizing the sampling because with this transmission method it is not possible to ensure a constant transmission time of the transformer signals via the Ethernet bus. The method proposed in this draft standard for digitally transmitting transformer signals is thus only another implementation variant of the second method according to the draft standard IEC 60044-8.

Both drafts are tailored to the requirements of protection and instrumentation and control. Both drafts are unsuitable (excessively low sampling rates) for transient recording and power quality measurements. The sampling rates which can be achieved according to IEC 60044-8 and 61850-9-1 lie in the region of 1 . . . 5 k sampling/s. The sampling rates which are necessary for transient recording and power quality measurements lie in the range 5 . . . 40 k samplings. These two drafts describe only the interface between the switch gear and protective unit or panel unit. The sensing and synchronization of the transformer data with another remains unresolved in these solution proposals.

A method of the type mentioned in the beginning can be found, for example, in DE 36 03 358 C3. In this previously disclosed method, telegrams with a network-wide uniform message number for the various messages are formed in a data converter from measurement variables which are acquired and digitally converted by measuring transformers and provided with a time stamp. It is assumed here that there is a negligible time offset of<6 ms between the actual registration of the measured values at the measuring transformer and the formation of the telegram. There is no provision for the registration of the measured values to be synchronized.

The invention is based on the object of developing the method described at the beginning in such a way that analog output measurement variables of transformers can be acquired, collected, and transmitted to the corresponding protective units or panel units at a high speed and in synchronism with one another.

According to the invention, in order to achieve this object, in the method described above, the analog output measurement variables are converted into the digital measurement variables, with a sampling rate which is higher than the minimum sampling rate by a factor, and are transmitted, the factor being an integral divisor of the number of filter coefficients of in each case one FIR filter in the data concentrator for each transformer; data is transferred, with the clock of a clock generator of the data concentrator, from buffers assigned to each transformer in the data concentrator into post-buffers assigned upstream of the FIR filters, and the telegram is composed, by means of a multiplexer, from output buffers assigned downstream of the FIR filters.

In one advantageous embodiment of the method according to the invention, a transmit telegram is generated with the digital measurement variables by means of a clock-synchronous logic arrangement and is transmitted from in each case one transmitter to in each case one data receiver on the data concentrator.

It is also considered advantageous if a clock which has the same frequency as the clock of a data receiver which is assigned in each case upstream of a buffer is generated with the clock generator of the data concentrator.

The invention also relates to an arrangement for sensing and digitally transmitting analog output measurement variables of a plurality of transformers to a protective unit or panel unit in which an analog-digital converter for forming digital measurement variables is assigned downstream of each transformer, and the outputs of the analog-digital converters are connected to a data concentrator which outputs, at its output connected to the protective unit or panel unit, a telegram with the digital measurement variables of the transformers with a predefined minimum sampling rate. Such an arrangement is known from DE 36 03 358 C3 which is dealt with above.

In order to be able to acquire, collect and transmit analog output measurement variables of transformers at a high speed and in synchronism with one another using such an arrangement, according to the invention each analog-digital converter operates with a sampling rate which is higher than the minimum sampling rate by a factor, the factor being an integral divisor of the number of filter coefficients of in each case one FIR filter in the data concentrator for each transformer; at the data concentrator, each transformer is assigned a buffer at the input end and post-buffers are connected to the buffers and to the FIR filters at the output end; a multiplexer is connected to output buffers arranged downstream of the FIR filters.

In the arrangement according to the invention, a clock-synchronous logic arrangement for forming a transmit telegram and a transmitter are advantageously arranged downstream of the respective analog-digital converter.

In addition, it is considered advantageous if the data concentrator has a clock generator which operates like the clock generator of the data receiver at the same frequency.

Figure 5:
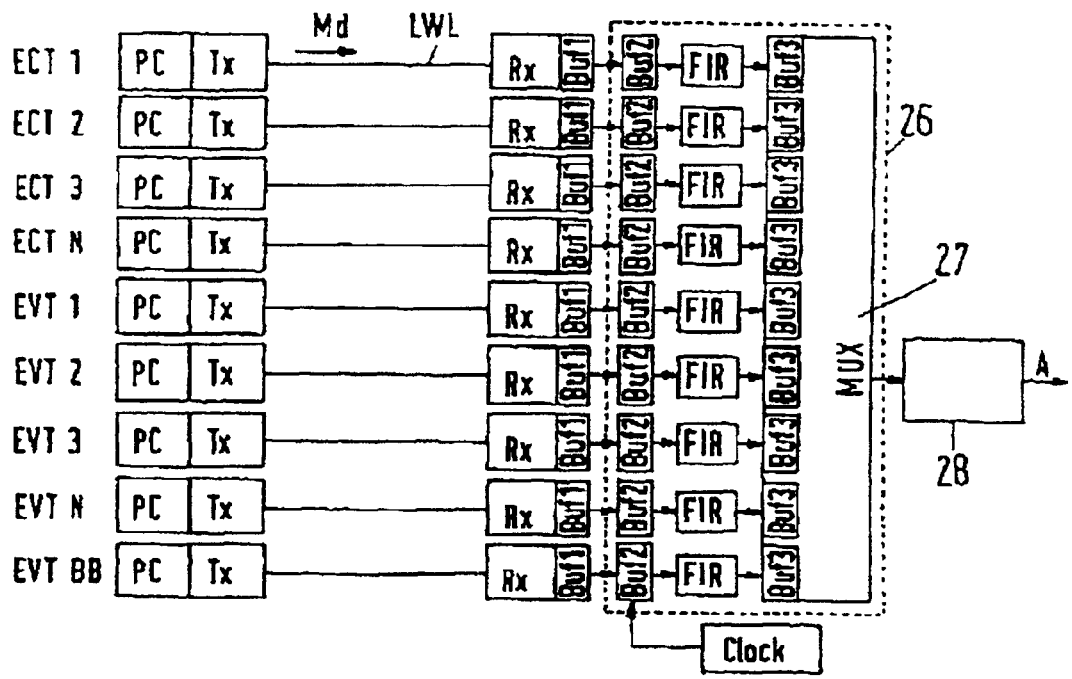
Figure 6:
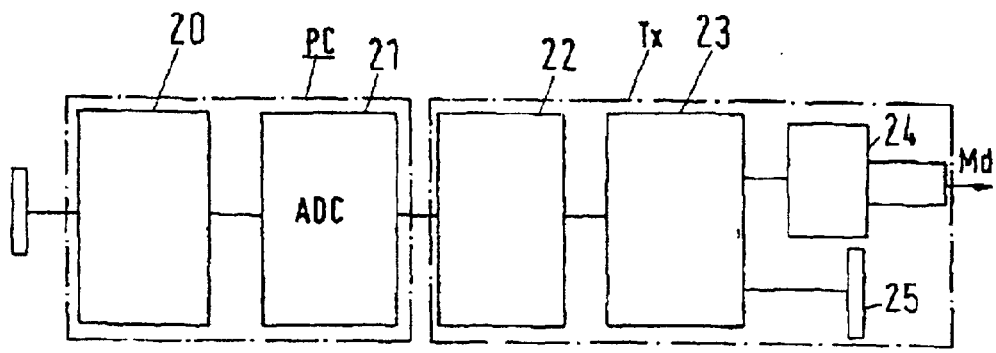
Figure 7:
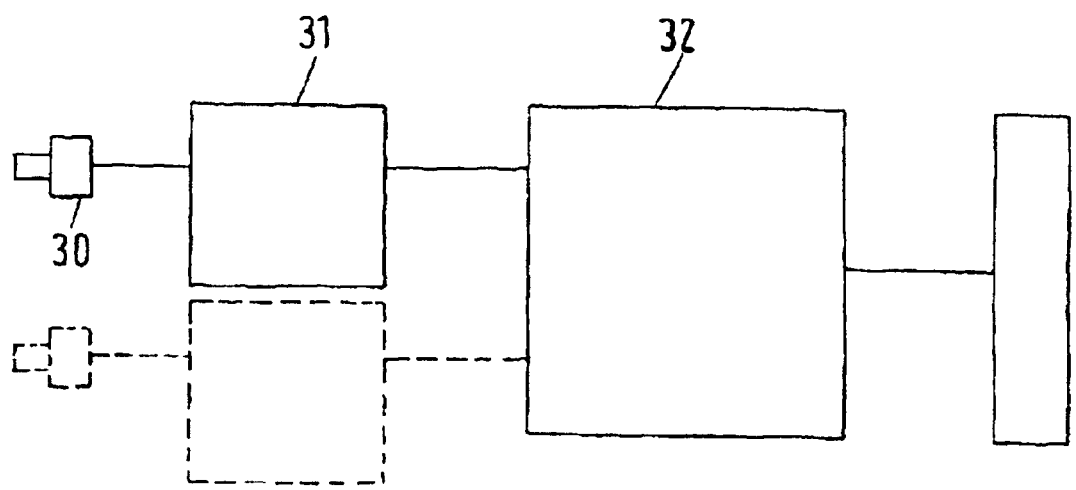

In order to explain the invention further,

FIG. 5 shows an exemplary embodiment of the arrangement according to the invention, FIG. 6 shows a detailed view of an exemplary embodiment of a primary part having the elements PC and Tx of the exemplary embodiment according to FIG. 5 and FIG. 7 shows a detailed exemplary embodiment of an input part of a protective unit or panel unit (not illustrated itself) connected to the arrangement according to FIG. 5.

In the exemplary embodiment according to FIG. 5 the analog output measurement variables which were supplied by the transformers ECT1 to EVTBB (not shown) are sampled and converted in each case into a module PC with an analog input circuit 20 and an analog-digital converter 21 (cf. FIG. 6). Arranged downstream of the module PC is a further module Tx which can in particular be constructed as is shown by the remaining part of FIG. 6 with the elements 22, 23, 24 and 25, the element 2 constituting a frame logic module, the element 23 a coding module, the element 24 an optical interface and the element 25 an electrical interface.

The digital measurement variables Md at the output of the module Tx of the arrangement according to FIG. 5 are transmitted to the data concentrator 26 via optical waveguide LWL, firstly to data receivers Rx which are assigned upstream of the data concentrator 26 and equipped on the input side—as shown by FIG. 7—with optical receivers 30. The telegrams which are received completely in each case by the data receiver Rx are written with the clock of the data receiver Rx into the buffers Buf1 which adjoin the data receivers Rx. Each data receiver Rx is operated with its own clock. This clock is synchronous with the clock of the connected transmitter Tx.

The data concentrator 26 also contains FIR filters FIR which are each assigned downstream of post-buffers Buf2 which for their part are connected to the buffers Buf1. At the output end, output buffers Buf3 are connected to the filters FIR. A multiplexer 26 is arranged downstream of the output buffers Buf3.

With this structure, the [lacuna] by the analog-digital converter 21 sampled and converted clock-synchronously in order to transmit the respectively previously sampled output measurement variable of the transformers. The A/D conversion and the transmission of the sampled values via the optical waveguide WL is carried out here with a sampling rate which is higher than the sampling rate of the output signal A at the output module 28 of the multiplexers 27 by a factor m, the factor m being an integral divisor of the number of the filter coefficients n of the FIR filter FIR which serves to reduce the sampling rate of the transmitted digital measurement variable Md by the factor m. The data concentrator 26 is operated with its own clock Clock. This clock is asynchronous with the clock of the receiver Rx but of the same frequency. The data of the completely received telegrams (that is to say the sampled values of the individual transformers) is transferred from the buffer Buf1 into all the post-buffers Buf2 in synchronism with the clock Clock. All the sampled values contained in the post-buffers Buf2 are then fed to the FIR filter FIR which acts as a low pass filter in order to reduce the sampling rate of the received sampled values by the factor m. The output signals of the filters FIR are written into the output buffers Buf3 of the data concentrator 26 in synchronism with the clock Clock with a sampling rate which is lower than the clock rate at the post-buffer Buf2 by the factor m.

In order to reduce the sampling rate, for example the coefficients of the FIR filter are all set to 1 and added up. The sum is not output from the filter until, for example, 4 sampled values in the multiplier adder unit of the FIR filter have been added up, so that, in the present example, a reduction of the sampling rate by a factor of 4 has taken place.

The multiplexer 27 is composed of a transmit telegram from the sampled values which are contained in its output buffers Buf3 and whose sampling rate is reduced, said transmit telegram being output in synchronism with the clock Clock via the output module 28 to the output-end transmission channel (not shown) of the data concentrator 26. The output module can optionally have interfaces according to IEC 60044-8 and IEC 61850-9-1 for connecting external equipment. Furthermore, the clock Clock of the data concentrator 26 can optionally be made available to an external device which processes the sampled values generated by the multiplexer 27.

In the arrangement according to the invention, the phase error of the sampling operations is therefore minimized by "oversampling" the analog output measurement variables of the transformers and synchronously "down sampling" in the data concentrator 26. An increase in the resolution of the samples is achieved by means of the down sampling in the data concentrator 27.

As is shown by FIG. 7, the transformer data transmitted as a telegram by the multiplexer 27 can be prepared in a communication module which is assigned upstream of a protection unit or panel unit (not illustrated). The communication module contains an optical waveguide receiver 30 at the input end and also has an integrated circuit 31 and a module 32 with frame decoder with redundancy controller and DPRAM and with a programmable, integrated logic arrangement; an interface is assigned downstream of the module 32.

Resampling of the transmitted sampled values takes place in the protection unit or panel unit. Because there are no processors (microcontrollers, digital signal processors, . . . ) in the signal path, no chronological influencing of the sampling operations by interrupt latency times takes place. The overall signal preprocessing is carried out exclusively via synchronously clocked logic. The transmission of the digital measurement variables to the digital protective unit (1 . . . 5 k sampling/s) acts in a chronologically transparent fashion as a result of high sample rates (>2 M sampling/s) and high transmission rates (>120 Mbit/s). The phase error which can be achieved is smaller than 0.1° here. As a result, the computing expenditure in the protective units and panel units is reduced significantly (no need for methods which are intensive in terms of computing time, such as interpolation of the measured values). The implementation of the proposed method in current equipment of this type is thus significantly simplified. The use of synchronously clocked logic simplifies the structure of redundancy controllers in the data concentrator and in the protective unit or panel unit. The transmission links can be configured as optical waveguide cables or as screened 2-wire lines (low-cost applications) When optical waveguides are used with simultaneous use of optical waveguide field bus technology for digital inputs and outputs it becomes possible to implement protective units and panel units with significantly improved EMC properties. As a result of the use of modern optical transmit diodes (VCSEL) and passive optical switches it is possible to connect up to 8 protective units or panel units to a data concentrator output.

What is claimed is:

1. A method for sensing and digitally transmitting analog output measurement variables of a plurality of transformers to a protective unit or panel unit in which:

the analog output measurement variables of each transformer are converted into digital measurement variables, the digital measurement variables are transmitted to a data concentrator, a telegram with the digital measurement variables of the transformers is formed in the data concentrator with a predefined minimum sampling rate, and the telegram is transmitted to the protective unit or panel unit, characterized in that the analog output measurement variables are converted into the digital measurement variables (Md) with a sampling rate which is higher than the minimum sampling rate by a factor (m), and are transmitted, the factor (m) being an integral division of the number (n) of filter coefficients of in each case one FIR filter (FIR) in the data concentrator (26) for each transformer (ECT1 . . EVTBB), data is transferred, with the clock of a clock generator of the data concentrator (26), from buffers (Buf1) assigned to each transformer (ECT1 . . EVTBB) into post-buffers (Buf2) assigned upstream of the FIR filters (FIR), and the telegram is composed, by means of a multiplexer (27), from output buffers (Buf3) assigned downstream of the FIR filters (FIR).

2. The method as claimed in claim 1, characterized in that a transmit telegram is generated with the digital measurement variables (Md) by means of a clock-synchronous logic arrangement and is transmitted from in each case one transmitter to in each case one data receiver (Rx) on the data concentrator (26).

3. The method as claimed in claim 1 or 2, characterized in that a clock which has an identical frequency to the clock of the data receiver (Rx) assigned upstream of a buffer (Buf1) is generated with the clock generator of the data concentrator (26).

4. An arrangement for sensing and digitally transmitting analog output measurement variables of a plurality of transformers to a protective unit or panel unit in which an analog-digital converter for forming digital measurement variables is assigned downstream of each transformer, and the outputs of the analog-digital converters are connected to a data concentrator which outputs, at its output connected to the protective unit or panel unit, a telegram with the digital measurement variables of the transformers with a predefined minimum sampling rate, characterized in that each analog-digital converter (21) operates with a sampling rate which is higher than the minimum sampling rate by a factor (m), the factor (m) being an integral division of the number (n) of filter coefficients of in each case one FIR filter in the data concentrator (26) for each transformer (ECT1 . . EVTBB), at the data concentrator (26), each transformer (ECT1 . . EVTBB) is assigned a buffer (Buf1) at the input end, post-buffers (Buf2) are connected to the buffers (Buf1) and to the FIR filters (FIR) at the output end, and a multiplexer (27) is connected to output buffers (Buf3) arranged downstream of the FIR filters (FIR).

5. The arrangement as claimed in claim 4, characterized in that a clock-synchronous logic arrangement for forming a transmit telegram and a transmitter (Tx) are arranged downstream of the respective analog-digital converter (21).

6. The arrangement as claimed in claim 5, characterized in that the data concentrator (26) has a clock generator which has an identical frequency to the clock generator to each buffer (Buf1) a data receiver (Rx).

* * * * *